United States Patent [19]

Madni et al.

[11] Patent Number: 5,111,206
[45] Date of Patent: May 5, 1992

[54] VELOCITY DECEPTION APPARATUS

[75] Inventors: Asad M. Madni, Los Angeles; Joseph Fala, Pasadena, both of Calif.

[73] Assignee: Systron Donner Corp., Concord, Calif.

[21] Appl. No.: 534,566

[22] Filed: Sep. 22, 1983

[51] Int. Cl.$^5$ .................. G01S 7/38; H03K 5/159
[52] U.S. Cl. ....................... 342/15; 328/55; 328/155; 377/43
[58] Field of Search ............ 343/18 R, 18 E; 307/511, 262, 271; 328/155, 14, 15, 140, 55; 342/15, 172; 377/43

[56] References Cited

U.S. PATENT DOCUMENTS

| | | | |
|---|---|---|---|
| 3,636,477 | 1/1972 | Selz | 328/155 X |
| 4,297,641 | 10/1981 | Sterzer | 343/18 E X |
| 4,338,528 | 7/1982 | Wolkstein | 343/18 E X |

OTHER PUBLICATIONS

B. M. Schiffmar, *A New Class of Broadband Microwave 90° Phase Shifters*, IRE Tran. MTT, pp. 232-237, Apr. 1958.

Primary Examiner—Gilberto Barron, Jr.
Attorney, Agent, or Firm—Flehr, Hohbach, Test, Albritton & Herbert

[57] ABSTRACT

A velocity deception apparatus utilizes a serrodynable digital phase shifter of the Schiffman type where each cell of the phase shifter is driven by an output of a multi-bit counter whose clock input in turn is driven by a voltage-to-frequency converter which has a pulse train output which responds substantially instantaneously to the analog value of a linear or second order function which produces the desired frequency translation. In practice, this performs as a velocity gate stealer which produces slowly changing false doppler frequencies.

11 Claims, 9 Drawing Sheets

| BINARY CODE | CELLS | | | | | PHASE SHIFT |
|---|---|---|---|---|---|---|
| | 11¼° | 22½° | 45° | 90° | 180° | |
| MSB  LSB 00000 | | | | | | 0 |
| 00001 | X | | | | | 11.25 |
| 00010 | | X | | | | 22.5 |
| 00011 | X | X | | | | 33.75 |
| 00100 | | | X | | | 45.00 |
| 00101 | X | | X | | | 56.25 |
| 00110 | | X | X | | | 67.5 |
| 00111 | X | X | X | | | 78.75 |
| 01000 | | | | X | | 90.00 |
| 01001 | X | | | X | | 101.25 |
| 01010 | | X | | X | | 112.5 |
| 01011 | X | X | | X | | 123.75 |
| 01100 | | | X | X | | 135.00 |
| 01101 | X | | X | X | | 146.25 |
| 01110 | | X | X | X | | 157.50 |

FIG.—8B

| BINARY CODE | CELLS | | | | | PHASE SHIFT |
|---|---|---|---|---|---|---|
| | 11¼° | 22½° | 45° | 90° | 180° | |
| 01111 | X | X | X | X | | 168.75 |
| 10000 | | | | | X | 180.00 |
| 10001 | X | | | | X | 191.25 |
| 10010 | | X | | | X | 202.50 |
| 10011 | X | X | | | X | 213.75 |
| 10100 | | | X | | X | 225.00 |
| 10101 | X | | X | | X | 236.75 |
| 10110 | | X | X | | X | 247.50 |
| 10111 | X | X | X | | X | 258.75 |
| 11000 | | | | X | X | 270.00 |
| 11001 | X | | | X | X | 281.25 |
| 11010 | | X | | X | X | 292.50 |
| 11011 | X | X | | X | X | 303.75 |
| 11100 | | | X | X | X | 315.00 |
| 11101 | X | | X | X | X | 326.25 |
| 11110 | | X | X | X | X | 337.50 |
| 11111 | X | X | X | X | X | 348.75 |

VELOCITY DECEPTION APPARATUS

The present invention is directed to velocity deception apparatus and more specifically to a solid state microwave preamplifier/frequency translator for velocity deception applications.

BACKGROUND OF THE INVENTION

As an electronic countermeasures (ECM) technique, it has been known to produce slowly changing false doppler frequencies by a so-called velocity gate stealer (VGS). Such apparatus, for example, might be mounted in an aircraft and would receive a radar pulse from the ground which is operating on the doppler system and then would pull the velocity tracker of the ground radar off the target return to drop it. The radar may then lock on the clutter or be forced into a reacquisition sequence.

A common implementation of the foregoing is a serrodyne technique utilizing a traveling wave tube (TWT). Serrodyning is, of course, phase modulation using the transit time modulation of a traveling wave tube. In practice, a voltage in the shape of a sawtooth waveform is impressed on the helix of the TWT to provide the desired phase shift.

Since the foregoing is most used in aircraft on aerial targets, weight, of course, is a critical factor.

Thus, it is an object of the invention to provide an improved velocity deception apparatus and more particularly one which is of relatively light weight but with significant control flexibility.

SUMMARY OF THE INVENTION

In accordance with the above object, there is provided a velocity deception apparatus for receiving radar signals and frequency translating them comprising a solid state variable phase shifter including a plurality of series coupled cells for inserting various and different phase shifts into said received radar signals by binary inputs to selected cells. A multi-bit counter means is connected to the phase shifter and has a number of binary outputs corresponding to the binary inputs of the plurality of cells each of the binary outputs being respectively connected to a binary input of a cell for enabling or disabling the cell. The counter also has a clock input. A voltage-to-frequency converter (VFC) drives the clock input and has an output train of binary pulses with a repetition rate proportional to the instantaneous voltage magnitude of an analog input waveform. Waveform generator means is connected to the VFC for generating a plurality of different analog input waveforms.

DESCRIPTION OF DRAWINGS

Tables 1A and 1B illustrate the operation of the phase shifter.

DESCRIPTION OF PHYSICAL EMBODIMENT

Figure 1:
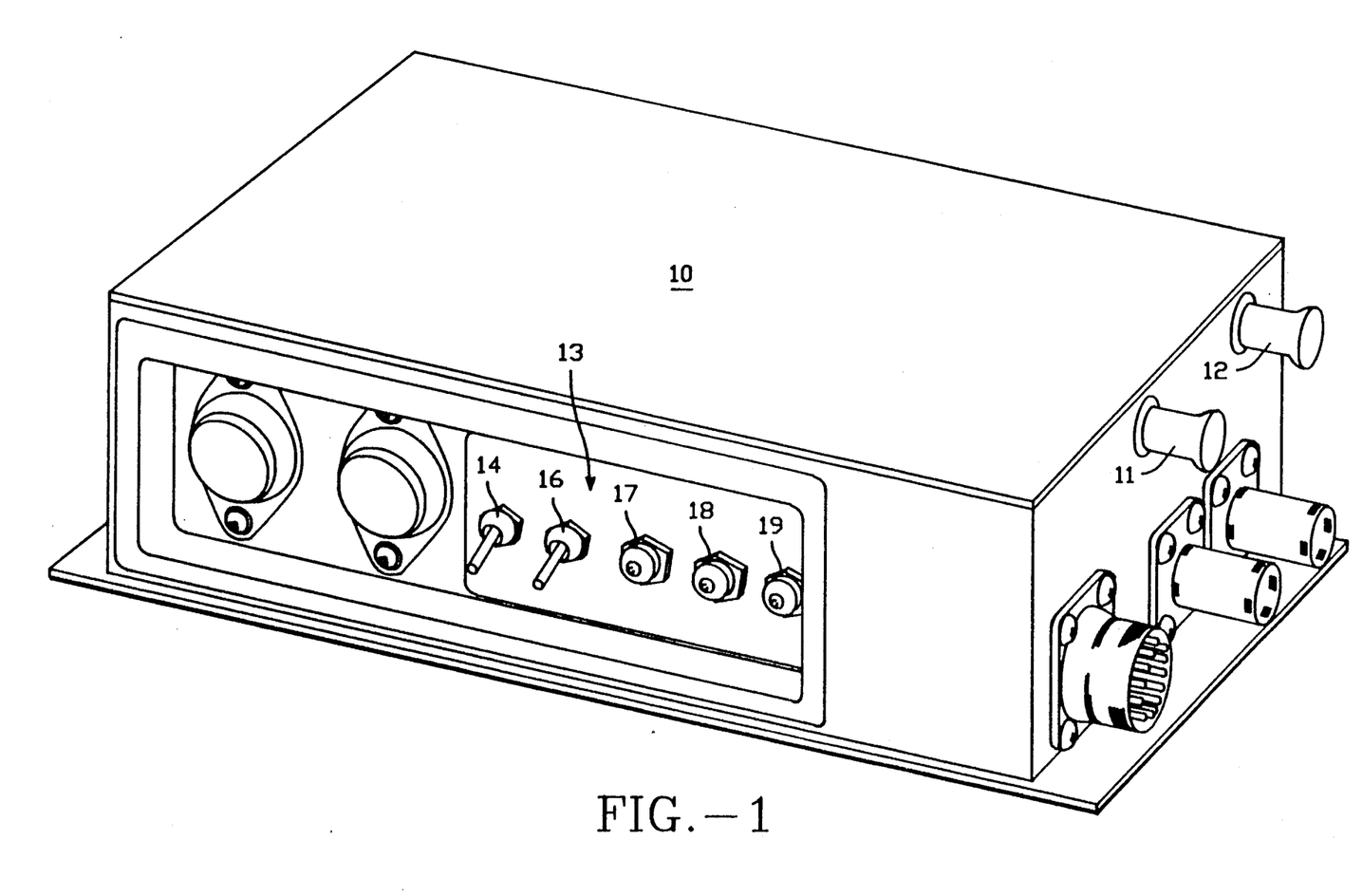
FIG. 1 is a perspective view of apparatus embodying the present invention as it would be installed in an aerial target.

FIG. 1 illustrates the physical apparatus or unit of the present invention in the form in which it would be installed in a pod, for example, of an aerial target. As illustrated, it is a three pound box 10 which has a radar or RF input at 11 and provides the frequency translated signal at the output 12. These would be connected to the standard antennas on the aerial target. There is a control module on the box indicated at 13 with two toggle switches and three adjustable potentiometers. Very briefly, the first toggle switch 14 designated negative (NEG) and positive (POS) controls an up/down counter which provides for either positive or negative frequency translation. Toggle 16 labeled LINEAR and PARA provides a frequency translation which is either a linear ramp function or a second order (parabolic) function. The first potentiometer 17 designated STOP FREQUENCY sets a maximum frequency of translation. The second potentiometer 18 designated DWELL TIME is the time between linear ramps (where no phase or frequency translation occurs); the WALK TIME potentiometer 19 adjusts the time duration of a single linear ramp (where the input signal is translated in frequency).

Figure 2:
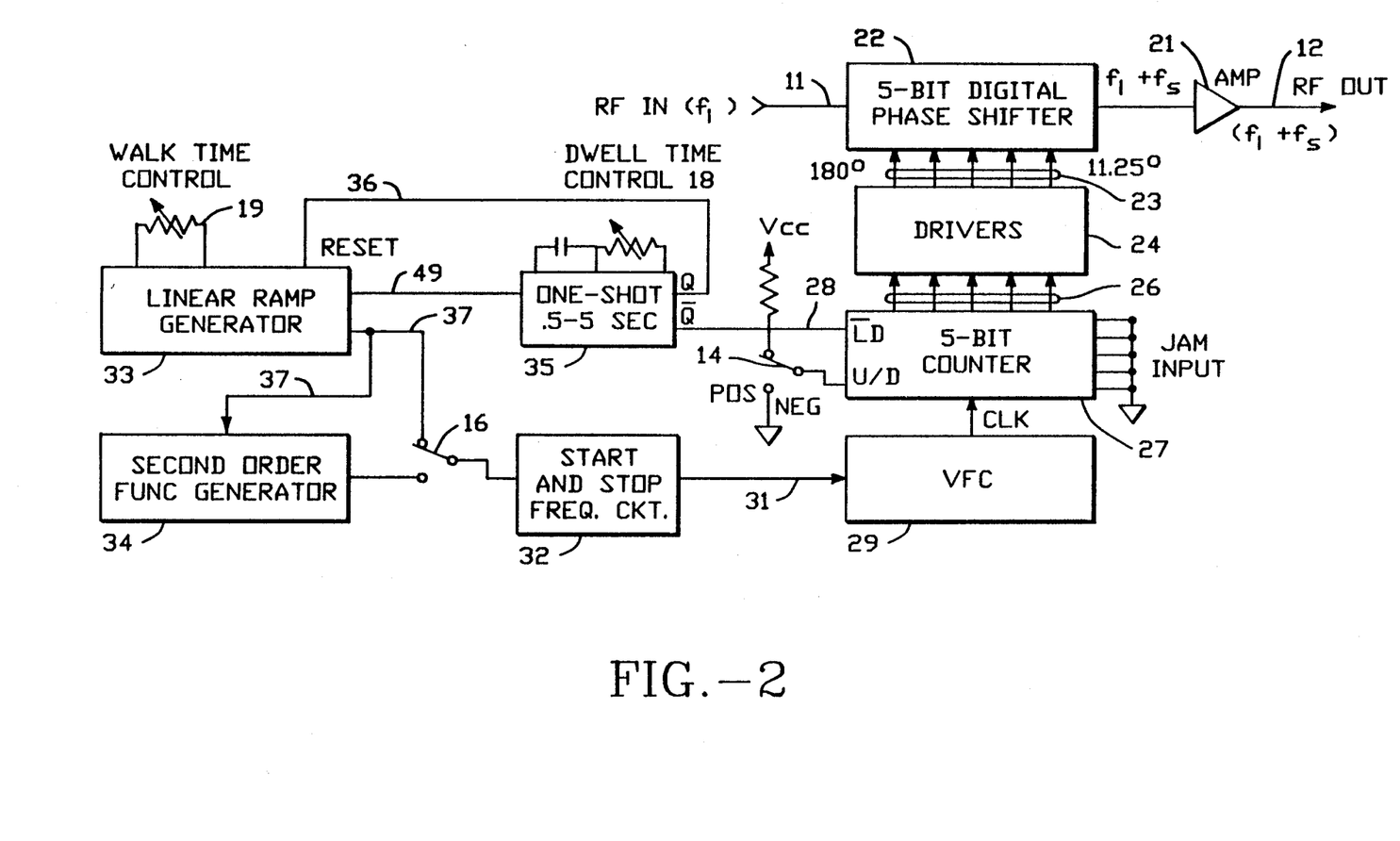
FIG. 2 is a block diagram of the circuit incorporated in the apparatus of FIG. 1.

Several of these controls are also shown in the overall block diagram of the invention in FIG. 2. The radio frequency input is illustrated at 11 and the frequency translated output at 12 after having been amplified by an amplifier 21. The block -22 designated 5-BIT DIGITAL PHASE SHIFTER is a solid state digital phase shifter which consists of five sections or cells of phase shifters that can be switched in and out of a series path to insert various and different phase shifts into the RF circuit. Thus, five binary inputs 23 are illustrated which can selectively shift the input signal in 32 fixed shift steps of 11.25° to 348.75°. Appropriate drivers are provided at 24 for these binary inputs and the drivers themselves are driven by the binary outputs 26 of a 5 bit counter 27. Counter 27 has a clock input so labeled, an up/down input U/D which is controlled by the toggle switch 14 which goes between ground and a positive voltage to determine the direction of count. Also there is a reset input at 28 which forces the jam inputs to zero.

Counter 27 is clocked by a voltage-to-frequency converter (VFC) 29. Converter 29 is of standard design, for example, available from Teledyne-Philbrick Corporation and is a free-running (Astable) voltage controlled multi-vibrator. Converter 29 has an output train of binary pulses on its clock output with a repetition rate which varies with and is proportional to the instantaneous voltage magnitude of the analog voltage input on line 31. This analog voltage is processed by the start and stop frequency circuit 32 which drives it through the switch 16 from either a linear ramp generator 33 or a second order function generator 34. Switch 16 is shown in a position to connect the linear ramp generator to the voltage-to-frequency converter 29. The walk time control 19 of the linear ramp generator is illustrated at 19 as a variable potentiometer (which is controlled by the screwdriver adjustment as illustrated in FIG. 1. Walk time is the rise time for a single linear ramp. The ramp output on line 37 of the ramp generator drives, via switch 16, the start and stop frequency circuit 32. A one shot device 35 is also actuated by another output line 49. As illustrated, the one shot device is variable between 0.5 and 5 seconds by the dwell time control 18 (that is, the time between sawtooth waveforms). The "Q" output 36 of the one shot is the reset to the ramp generator 33 and the inverted output, $\overline{Q}$, on the line 28, the reset line to the counter 27.

Linear ramp generator output 37 drives the second order function generator 34 which, for example, will generate a parabolic function. This function is coupled to the VFC 29 by actuation of switch 16.

Figure 3:
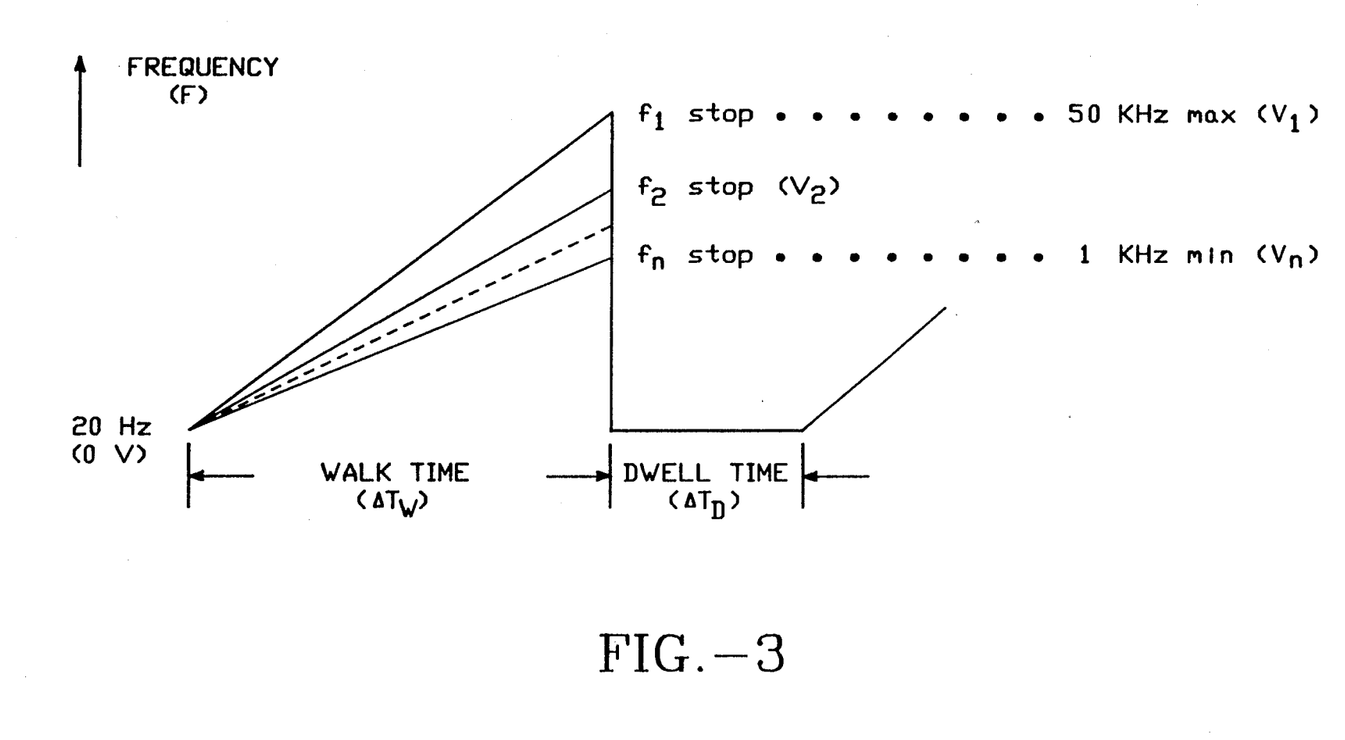
FIG. 3 is a function diagram useful in understanding the operation of the invention.

Referring to FIG. 3, this illustrates the linear ramp function of output 37 showing stop translation frequency (frequency deviation) versus time. As discussed, by means of the external controls 18 and 19, both dwell and walk time are adjustable. The initial frequency designated 20 hertz is an offset which is minimized to be as small as possible. And then by means of the stop frequency potentiometer adjustment switch, as illustrated in FIG. 1, the magnitude of the ramp is adjustable as indicated from $f_n$ to $f_l$, for example, for a range from 1 (one) KHz to 50 KHz frequency translation. Such deviation adjustment is accomplished in the start and stop frequency circuit 32 shown in FIG. 2 which will be described in detail below.

Figure 4:
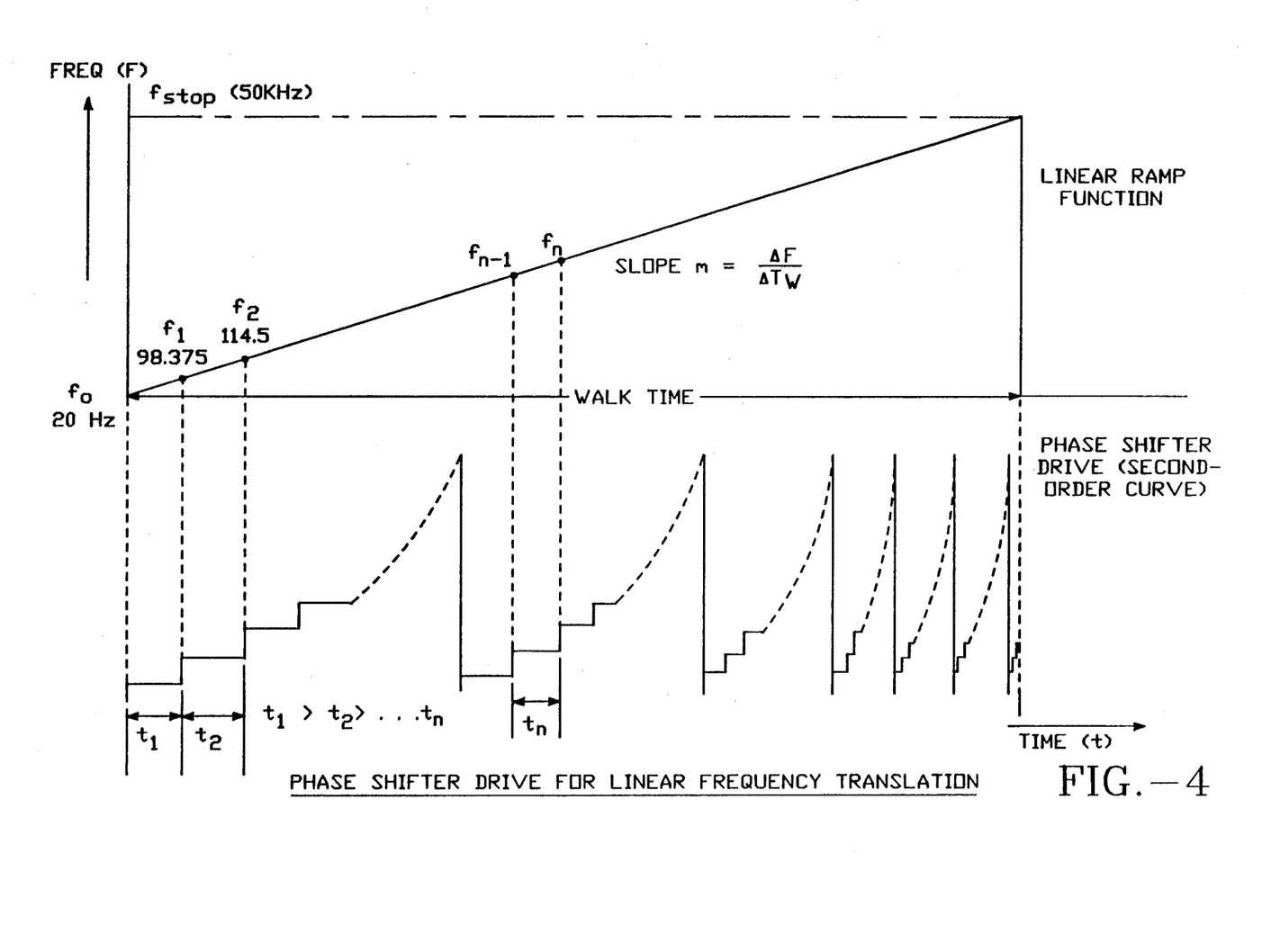
FIG. 4 is another function diagram useful in understanding the operation of the invention.

FIG. 4 shows the relationship between the walk time and the digital drive to phase shifter 22 for the linear translation mode. Such drive is the five outputs 26 of the five bit counter 27 to the shifter 22. Typical numerical values are given assuming the slope of the walk time ramp is approximately equal to 50 K and that the 5 bit counter 27 provides 32 steps. The time interval $$t_1 = \frac{1}{f_{o(32)}} + 5 \ \mu sec$$

where 5 μsec is the set-up time of the VFC. Hence $t_1 = 1.567$ μsec. Using the relationship:

$$\frac{f_1 - 20}{1.567 \ \mu sec} = 50K$$

we get $f_1 = 98.375$ μsec. Similarly, any given frequency point can be computed using the general equation:

$$\frac{f_n - f_{n-1}}{t_n} = \frac{\Delta F}{\Delta T_w}.$$

Thus, over a period, for example, of a one second walk time, $T_w$, a total of 142,000 frequencies will be walked through.

Since the rate at which the binary counter 27 is changed is linear, the drive to the phase shifter, as shown in FIG. 4, will be of a second order curve type. It is thus, apparent that when the second order function generator 34 (FIG. 2) drives the voltage-to-frequency converter and the 5 bit counter that the drive to the phase shifter with respect to the walk time now appears as a higher order curve with each curve once again representing 32 steps of increasing frequency.

Figure 5:
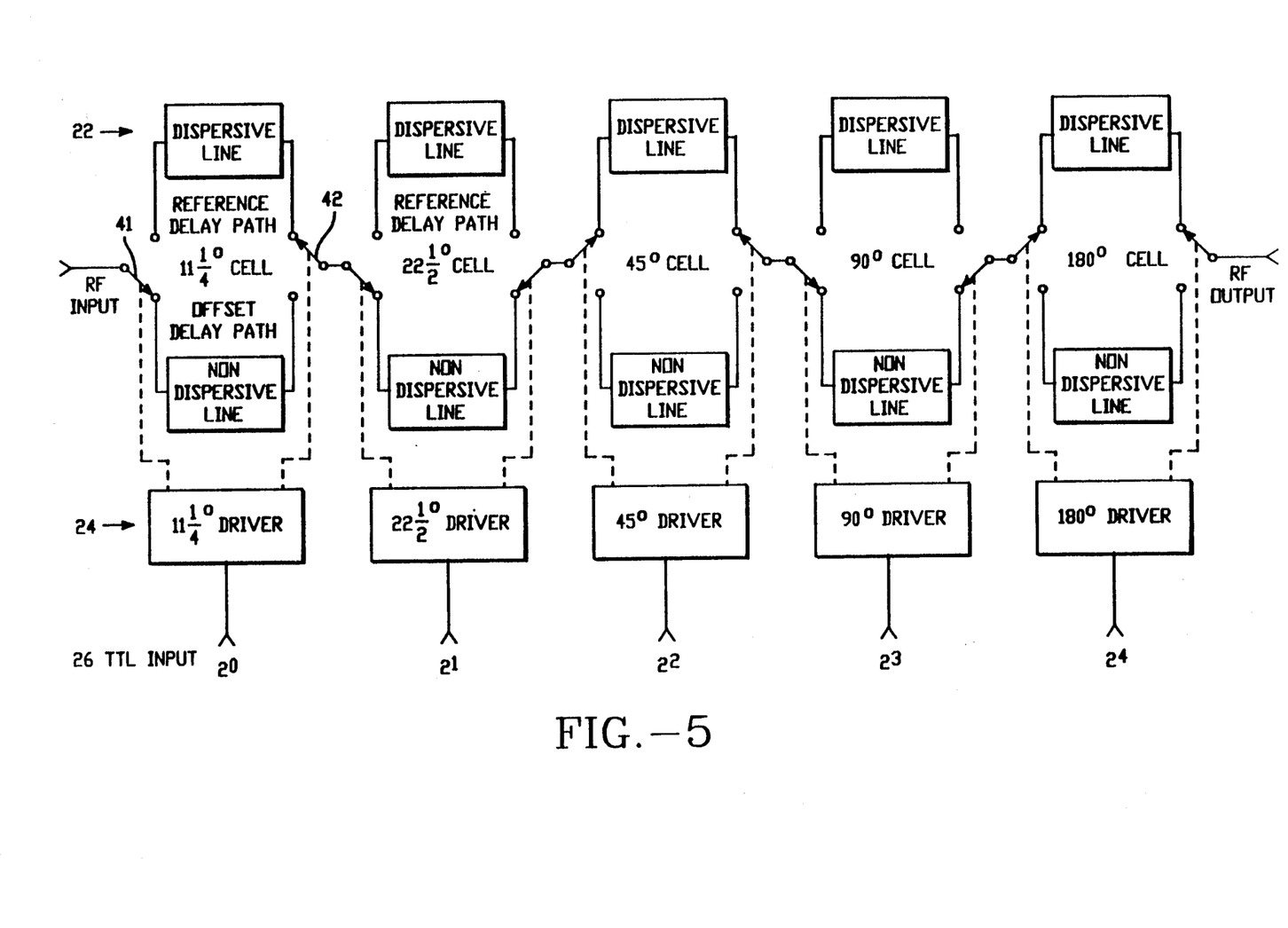
FIG. 5 is a block diagram of a solid state phase shifter used in the present invention.

FIG. 5 illustrates a typical Schiffman type phase shifter with five cells. Each cell has a respective time delay as indicated of $11\frac{1}{4}°$, $22\frac{1}{2}°$, $45°$, $90°$ and $180°$. Each cell contains two single pole diode switches indicated, for example, in the first cell as switches 41 and 42 which switch the RF input signal between a reference delay line designated DISPERSIVE and an offset delay line designated NON-DISPERSIVE. In accordance with the Schiffman cell technology, the radio frequency phase length of the non-dispersive delay line is always greater in insertion delay than the reference delay path by a fixed differential radio frequency phase shift. This represents the weighted phase shift of that particular cell. Each cell is driven by an individual driver indicated at 24 for driving the solid state switches 41, 42 for alternately series connecting either the dispersive or non-dispersive lines of the cell in response to the TTL inputs illustrated at 26. These are designated $2^0$ to $2^4$. And such inputs are actually the outputs of the 5 bit counter.

Figure 8A:
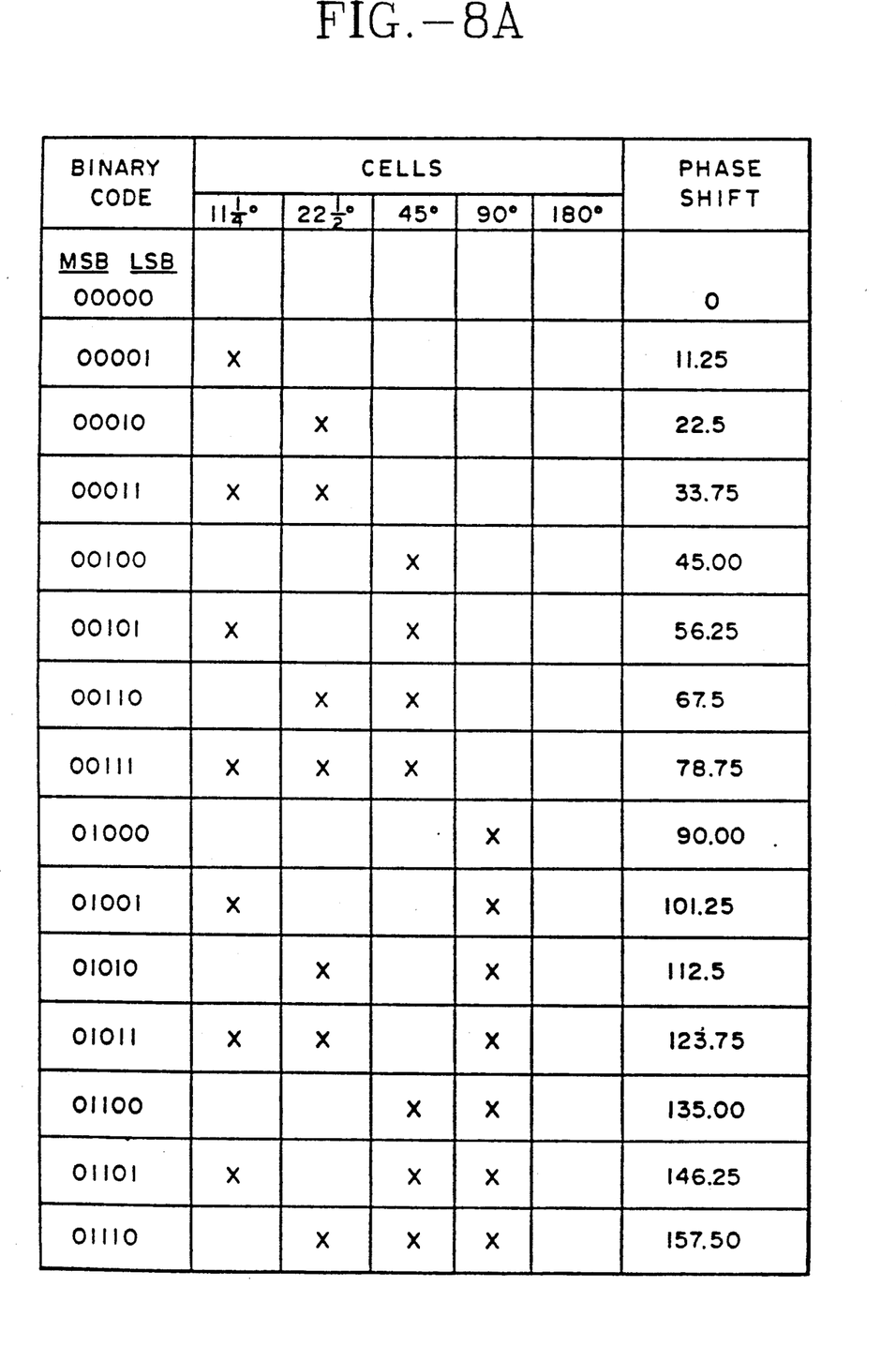
Figure 8B:
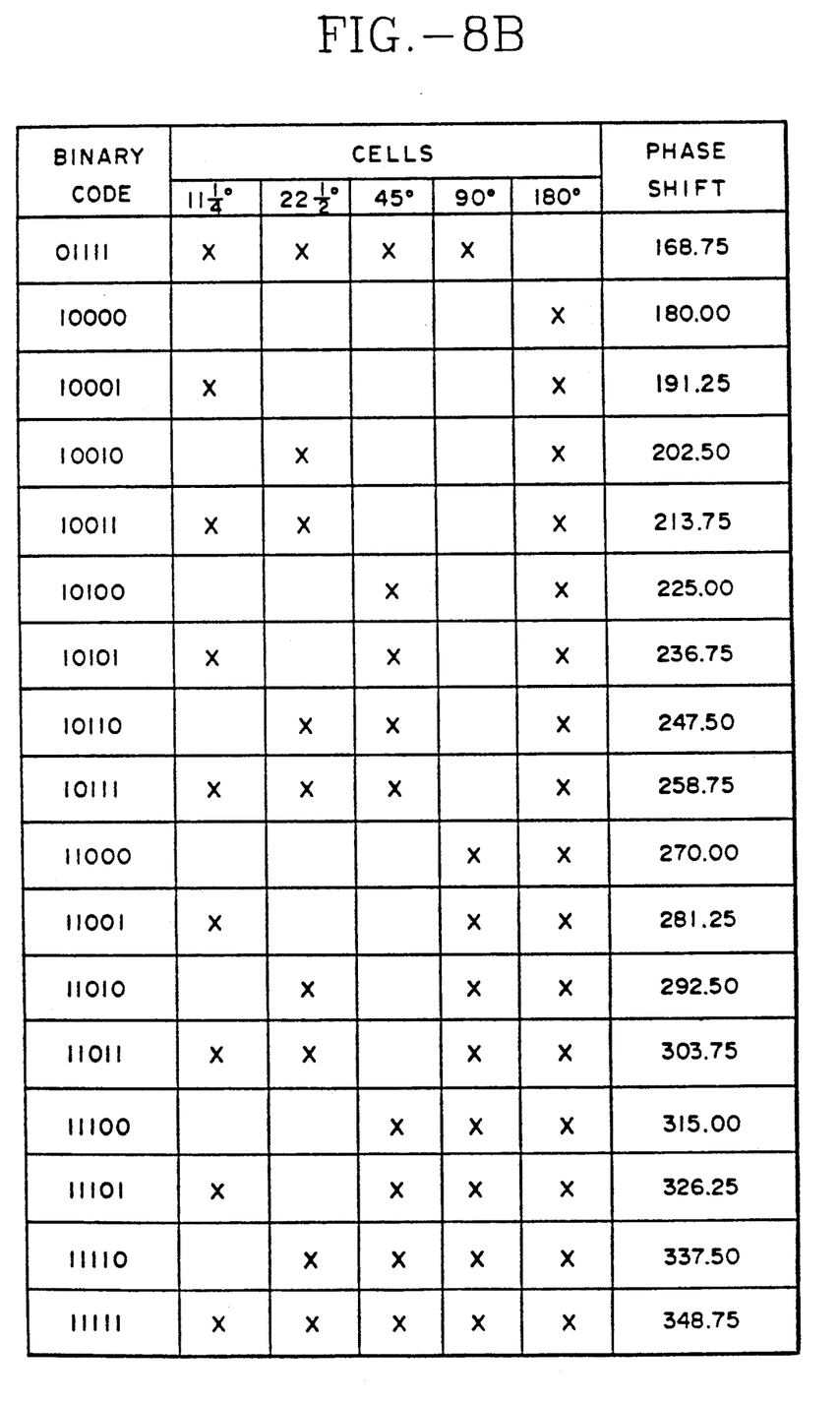

Tables 1A and 1B list the cells switching condition for each of the 32 words of the 5 bit binary input signal.

Figure 6:
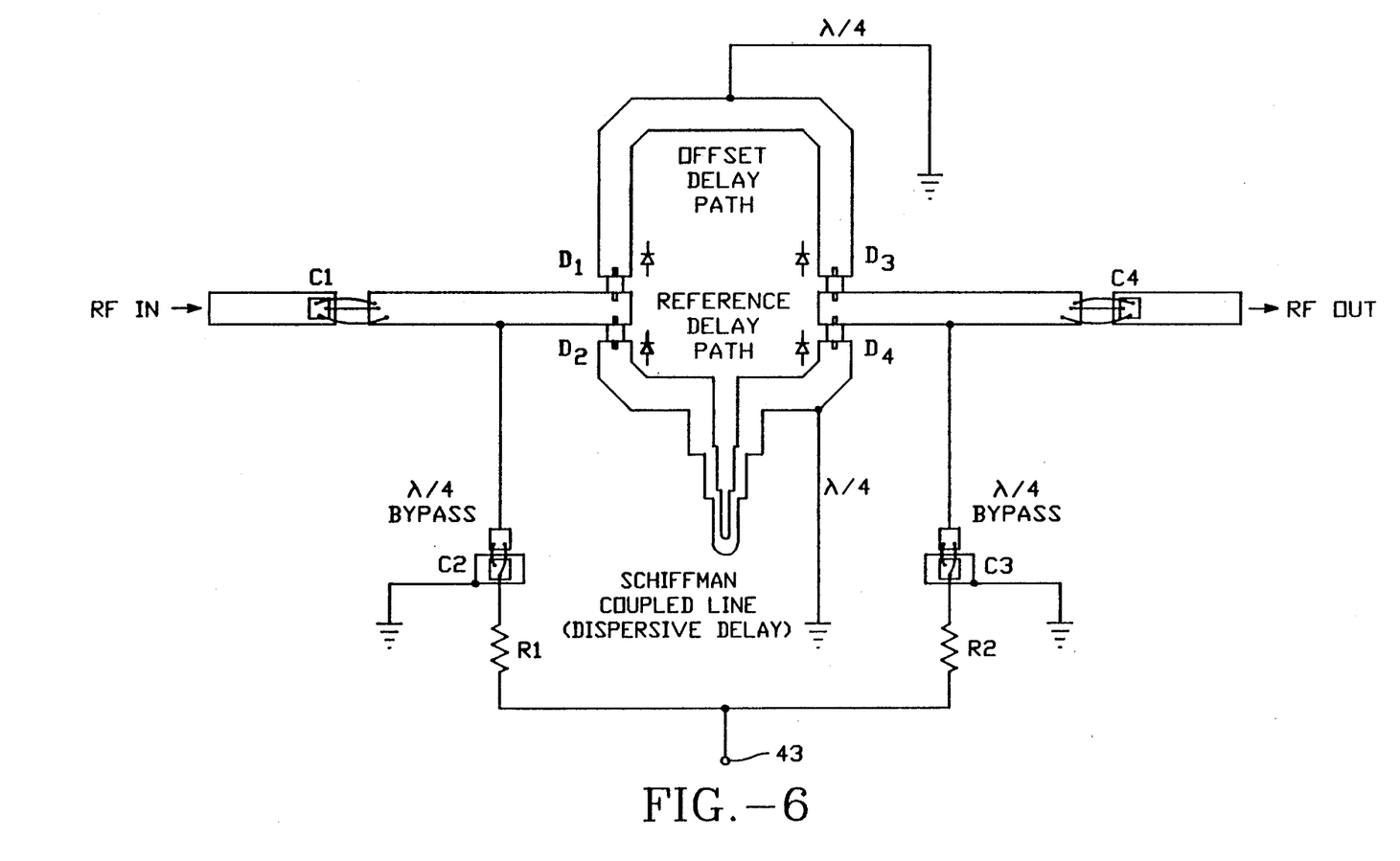
FIG. 6 is a plane view in simplified format of a typical portion of the phase shifter of FIG. 5.

FIG. 6 shows in detail a typical Schiffman type cell. RF in and RF out are indicated as well as the offset delay path and the reference delay path. Capacitors C1 through C4 are chip capacitors and diodes D1 through D4 are beam lead diodes. Binary being negative on the driver input 43 enables the reference path and a positive the offset path. The diode switches D1 through D4 serve the purpose schematically indicated by switches 41 and 42 in FIG. 5.

The dispersive delay line utilizes a Schiffman type phase shifter as its basic phase shift element. These phase shifters are described in more detail in an article by B. M. Schiffman entitled "A New Class of Broadband Microwave 90° Phase Shifters", IRE Transactions MTT, pages 232-237, April 1958. Other types of digital phase shifters would be suitable in the present invention but only if they would have the broadband capabilities of the present Schiffman device.

Figure 7:
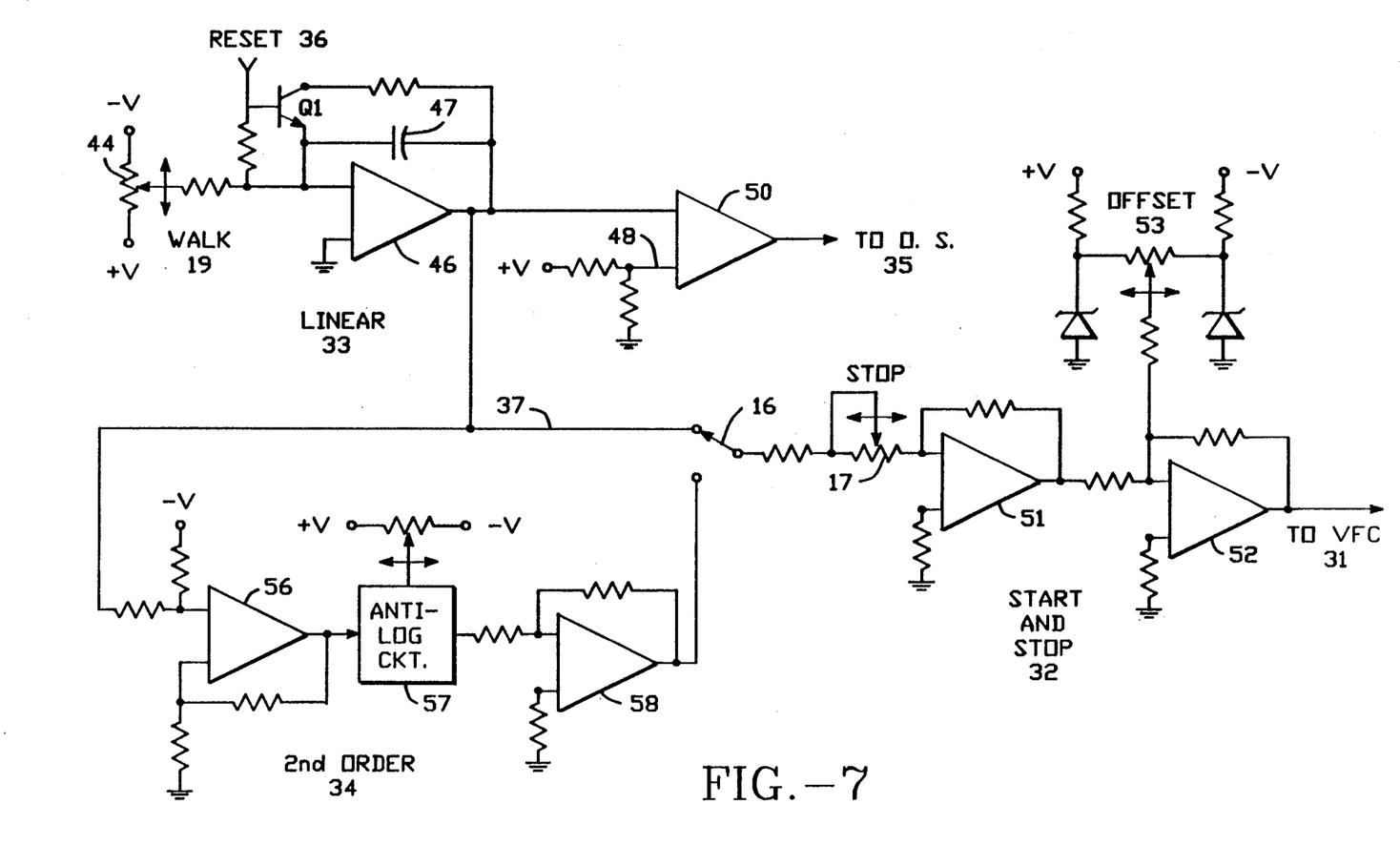
FIG. 7 is a detailed circuit schematic of a portion of FIG. 2.

FIG. 7 illustrates in greater detail the linear and second order function generators 33 and 34 and the stop/start circuitry 32. With respect to the linear ramp generator 33, the walk time control unit 19 is actually a potentiometer 44 which drives an integrating operational amplifier 46. The ramping time is controlled by potentiometer 44 which sums the current into the integrator and is directly proportional to the charging time of the associated capacitor 47. In general, the value of the potentiometer 44 is chosen so that the minimum ramp time will be one second and the maximum time will be ten seconds.

A comparator 47 compares ramp voltage to a preset reference voltage which is on the input 48. When this is reached, the output 49 is activated which triggers the one shot device 35 as illustrated in FIG. 2. When the one shot is triggered, a pulse is produced on the reset line 36 which closes the transistor Q1 to discharge the capacitor 47. This one shot output pulse has a duration which is setable by the dwell time control 18. The dwell time control is chosen so that a minimum pulse duration will be 0.5 seconds and the maximum pulse 5 seconds. For the duration of this one shot pulse, the integrating amplifier 46 is not allowed to charge. On the trailing edge, the integrated capacitor is again allowed to charge to provide a ramp such as illustrated in FIG. 3.

Next, the output of this linear ramp from operational amplifier 46 is coupled on its line 37 through the switch 16 to the start/stop circuit 32. A non-inverting variable gain amplifier 51 is provided which has a variable input which is the stop potentiometer 17. This is illustrated graphically in FIG. 3. The value of this potentiometer is chosen so that the maximum setable voltage will correspond to the 50 kilohertz translation frequency and the minimum to one kilohertz. This minimum and maximum may be set to the desired user's needs. It should be noted that the output of this variable gain amplifier does not affect the start frequency, walk time or dwell time.

The output of amplifier 51 drives a "start" or offset operational amplifier 52 which has as its output line 31 which is connected to VFC 29. One of the inputs of the operational amplifier includes an offset potentiometer 53 which adjusts the start voltage to a minimum value to minimize initial frequency shift. In other words, it would be impracticable to start at a zero offset voltage so some nominal minimum amount is used. Doppler return characteristics of targets as seen at doppler radar receivers are usually in the range of few KHz to 50 KHz. The radar will track this false doppler target, provided the radar velocity gate acquires it, provided there is a sufficient amount of jamming power and assuming no antivelocity deception ECCM circuits in the radar. There exists an empty area about the input frequency that contains no jamming. This is because the serrodyning sawtooth waveform has to start at some frequency. In practice, the value can be kept in the range of 20 to 100 Hz.

Lastly, the second order function generator 34 has as its input the output line 37 of the ramp generator 33. This drives an operational amplifier 56 which in turn drives an antilog circuit 57 which provides a second order or parabolic function. It is available as a standard item from, for example, Analog Device Corporation. It is factory adjustable. This in turn drives amplifier 58 and switch 16.

As discussed above, an idealized device of this type which utilizes a serrodyne phase shifter, such as a traveling wave tube, has no phase rate discontinuity or non-linearities and translates the input frequency to the offset frequency with no spurious sidebands in the output. Since the present invention, as illustrated in FIG. 4, necessarily does this in discrete steps, there are spurious frequencies; but these are minimized at several decibels below the main output frequencies.

Specifically, for a 32-step operation with positive phase slope, the 33rd and 65th sidebands on the (+) side of the spectrum appear with amplitudes reduced by 30.4 and 36.1 dB, respectively, relative to the translated input carrier frequency. Similarly, the 31st and 63rd sidebands appear on the (−) side of the spectrum. Relative amplitudes of the 31st and 63rd (−) sidebands are 29.8 and 35.9 dB, respectively.

Thus, the present invention recreates the direct voltage adjustment of the helix of a TWT by the use of a hybrid analog-digital technique and with a significant weight reduction; for example, from 13 pounds to 3 pounds of weight. This is especially desirable in an aircraft embodiment. And this is done still maintaining a frequency bandwidth of 5.4–10.6 GHz which is mainly due to the use of a Schiffman type phase shifter. Finally, spurious sideband suppression is at least −20 dB.

In general, the good performance of the digital technique of the present invention is provided by the use of a voltage-to-frequency converter to instantaneously convert to a pulse train either the linear or the second order analog functions and then utilizing this pulse train to act as the clock input of a counter which has the same bit capacity as the number of cells of the phase shifter.

Another side benefit of the use of the present technique is the easy adjustment of the walk and dwell times.

What is claimed is:

1. Velocity deception apparatus for receiving radar signals and frequency translating them comprising:
   a solid state variable phase shifter including a plurality of series coupled cells for inserting various different phase shifts into said received radar signals by binary inputs to selected cells;
   multi-bit counter means connected to said phase shifter and having a number of binary outputs corresponding to said binary inputs of said plurality of cells each of said binary outputs being respectively connected to a binary input of a cell for enabling or disabling such cell, said counter also having a clock input;
   a voltage-to-frequency converter (VFC) for driving said clock input having an output train of binary pulses with a repetition rate proportional to the instantaneous voltage magnitude of an analog input waveform; and
   waveform generator means connected to said VFC for generating a said analog input waveform of a ramp type having a starting point which minimizes the amount of initial frequency translation of the received radar signal and a maximum for determining the maximum frequency translation whereby a said received radar signal is frequency translated from its initial value to such maximum in a period of time determined by the period of said ramp type waveform, said period of time being a walk time.

2. Apparatus as in claim 1 where said cells are of the Schiffman type.

3. Apparatus as in claim 1 where said analog waveform includes a linear waveform and a parabolic waveform.

4. Apparatus as in claim 3 where said linear waveform is a ramp function having walk and dwell times said walk time being the time duration of a single ramp and said dwell time the time between ramps and where said waveform generator means includes means for adjusting the walk and dwell times of said linear waveform.

5. Apparatus as in claim 4 where said walk time is variable from 1 to 10 seconds and said dwell time is variable from 0.5 to 5 seconds.

6. Apparatus as in claim 1 where said counter means includes an up/down control input and said velocity deception apparatus includes switch means for driving such input to selectively provide positive and negative frequency translation of said received radar signal.

7. Apparatus as in claim 1 including stop frequency means coupled between said VFC and waveform generator means for controlling the magnitude of said waveform whereby maximum frequency translation is controlled.

8. Apparatus as in claim 7 also including offset means for minimizing an initial frequency shift.

9. Apparatus as in claim 2 where each of said Schiffman cells includes a dispersive line and a non-dispersive line and switch means for alternately series connecting such lines in response to said binary inputs.

10. Apparatus as in claim 9 where there are 5 cells having respective time delays of $11\frac{1}{4}$, $22\frac{1}{2}$, 45, 90 and 180 degrees.

11. Apparatus as in claim 1 where said counter means is responsive to increasing repetition rates of said clock input caused by said ramp type waveform input to said VFC to provide for a gradually increasing frequency translation by serrodyning of said phase shifter.

* * * * *